United States Patent [19]
Detwiler

[11] Patent Number: 5,192,857
[45] Date of Patent: Mar. 9, 1993

[54] COMPACT OPTICAL SCANNER ROTATABLE BETWEEN HORIZONTAL AND VERTICAL POSITIONS

[75] Inventor: Paul O. Detwiler, New Concord, Ohio

[73] Assignee: NCR Corporation, Dayton, Ohio

[21] Appl. No.: 590,202

[22] Filed: Sep. 28, 1990

[51] Int. Cl.[5] .............................................. G06K 7/10
[52] U.S. Cl. ................................................. 235/467
[58] Field of Search ....................... 235/467, 470, 462; 248/185, 183, 278, 284, 291, 474, 479, 923

[56] References Cited

U.S. PATENT DOCUMENTS

| | | | |
|---|---|---|---|
| D. 325,729 | 4/1992 | Forsythe | D14/107 |
| 4,043,632 | 8/1977 | Jeffery et al. | 235/467 X |
| 4,194,126 | 3/1980 | Rabinow | 250/566 |
| 4,575,625 | 3/1986 | Knowles | 235/467 |
| 4,753,498 | 6/1988 | Saitoh et al. | 350/6.8 |
| 4,762,984 | 8/1988 | Knowles et al. | 235/383 |
| 4,797,551 | 1/1989 | Ferrante | 250/234 |
| 4,840,083 | 6/1989 | Hagan et al. | 74/574 |
| 4,853,521 | 8/1989 | Claeys et al. | 235/375 |
| 4,871,904 | 10/1989 | Metlisky et al. | 235/467 |
| 4,939,356 | 7/1990 | Rando et al. | 235/467 |
| 4,944,481 | 7/1990 | Yurchenco et al. | 248/923 X |
| 4,963,721 | 10/1990 | Kohno et al. | 235/462 |
| 4,967,076 | 10/1990 | Schuhmacher et al. | 250/236 |
| 4,971,410 | 11/1990 | Wike, Jr. et al. | 235/472 |
| 4,995,579 | 2/1991 | Kitamura | 248/284 |
| 5,000,529 | 3/1991 | Katoh et al. | 235/467 X |
| 5,039,051 | 8/1991 | Umebara et al. | 248/284 |
| 5,108,062 | 4/1992 | Detwiler | 248/185 |
| 5,140,141 | 8/1992 | Inagaki et al. | 235/462 |

FOREIGN PATENT DOCUMENTS 0040973 12/1981 European Pat. Off. .
1-048017 2/1989 Japan .

Primary Examiner—John Shepperd
Assistant Examiner—Edward H. Sikorski
Attorney, Agent, or Firm—Richard W. Lavin

[57] ABSTRACT

A compact optical scanner comprises a housing assembly rotatably mounted on a support member for movement between horizontal and vertical positions. A pair of compressed flexible arms inserted into socket 28 of the support member 26 provide a frictional drag when the housing assembly is rotated, allowing the assembly to be oriented at any position. The housing assembly includes an outer housing member having a scanning aperture and an inner housing member containing an optical scanning apparatus for projecting scanning light beams through the aperture for scanning a bar coded label. A source of scanning light beams mounted in one of the walls of the inner housing member projects the light beams along a path to a multifaceted spinner which is mounted offset to the light path. The mirror facets on the spinner are offset to each other to reflect the light beams at a pair of pattern forming mirrors which form a scanning pattern composed of a plurality of slightly curved scan lines for scanning truncated bar code labels.

15 Claims, 10 Drawing Sheets

COMPACT OPTICAL SCANNER ROTATABLE BETWEEN HORIZONTAL AND VERTICAL POSITIONS

CROSS REFERENCE TO RELATED APPLICATION

Scanner Support Apparatus, co-pending application, Ser. No. 590,577, filed on even date herewith, invented by Paul O. Detwiler, assigned to the NCR Corp. which matured into U.S. Pat. No. 5,708,062 on Apr. 28, 1992.

Optical Scanner or Similar Article, co-pending application, Ser. No. 590,578, filed on even date herewith, invented by Donald L. Forsythe and David M. J. Allgeier, assigned to the NCR Corp. which matured into U.S. Pat. No. 5,325,729, on Apr. 28, 1992.

BACKGROUND OF INVENTION

The present invention relates to optical scanning systems and more particularly to an optical bar code scanning system which can be mounted in or on a check-out counter in either a vertical or horizontal position for scanning bar code labels on a merchandise article which is moved past a scanning aperture located in the bar code scanner.

In present-day merchandising point-of-sale operations, data pertaining to the purchase of a merchandise item is obtained by reading data encoded indicia or symbols such as a bar code printed on the merchandise item. In order to standardize the bar codes used in various point-of-sale checkout systems, the grocery industry has adapted a uniform product code (UPC) which is in the form of a bar code. Various reading systems have been constructed to read this type of bar code, including hand-held wands which are moved across the bar code and stationary optical reader systems normally located within the checkout counter in which the bar code is read by projecting a plurality of scanning light beams through a window constituting the scanning area of the counter over which the bar code printed on a purchased merchandise item or on a bar code label attached to the merchandise item is moved. This scanning operation is normally part of the process of loading the item in a shopping cart. Previously the bar code label on which the industry has standardized was large enough to allow scanning operations to occur irrespective of the orientation of the bar code label. But recent developments in merchandise packaging have led to the introduction of bar code labels which are long and narrow, requiring that the bar code label be oriented in a predetermined position to allow the scanning apparatus to effectively read the bar code label. Since the merchandise items on which the narrow bar code label has been affixed are small in size, the reading of this type of label has proved troublesome. It would be desirable to have a compact optical scanner for generating a scanning pattern which enables a small size merchandise item having a long and narrow width bar code to be easily scanned. It would further be desirable to have a compact optical scanner which can be rotated between a vertical and a horizontal position allowing merchandise items to be conveniently read by passing the merchandise item either in front of, over, or under the scanning apparatus, thereby increasing the speed of processing the merchandise item through the checkout system.

SUMMARY OF THE INVENTION

There is provided, in accordance with the present invention, an optical scanning unit which is mounted for rotation to a support member which is normally secured to the top of a checkout counter. The optical scanning apparatus can be rotated to a horizontal position which allows a bar code label to be read when passed underneath or over the optical scanning apparatus. The optical scanning apparatus can further be rotated to a vertical position allowing a bar code label on a merchandise item to be read when the merchandise item is moved past the side of the scanning apparatus. The scanning apparatus includes a first housing member including a surface having an aperture therein, a second housing member mounted within said first housing member including a floor portion and oppositely located first and second wall portions located adjacent said aperture, a third wall portion extending between said first and second wall portions, a source of a coherent light beam mounted in said third wall portion for projecting the light beam along the floor portion of said second housing member, first light deflecting means mounted on said floor portion for deflecting the projected light beam along a first light path, scanning means mounted on said floor portion adjacent said second wall portion and in said first light path for cyclically sweeping the light beam along a plurality of second light paths, second light deflecting means mounted adjacent the floor portion and in said second light paths for deflecting the light beams along a plurality of third light paths through said aperture in the form of a scanning pattern for scanning a bar code label positioned adjacent the aperture, a lens member positioned adjacent said first light deflecting means and said first wall portion for collecting the light beams reflected from the scanned bar code label and directing the collected light beams along a fourth light path, and detecting means mounted in said first wall portion and in said fourth light path for generating electrical signals in response to receiving the collected light beams from said lens member. Pivot means secured to said first housing member and to a support member allows the scanning apparatus to be rotated between horizontal and vertical positions.

It is therefore a principal object of this invention to provide an optical scanning apparatus which generates a scan pattern comprised of essentially parallel scan lines for reading severely truncated bar code labels.

It is another object of this invention to provide an optical scanner which is compact in structure and which is rotatably mounted to a support member for movement between horizontal and vertical operating positions.

It is a further object of this invention to provide a compact optical scanning apparatus which is simple in construction and therefore low in cost.

BRIEF DESCRIPTION OF THE DRAWINGS

These and other objects, features and advantages of the invention, as well as the invention itself, will become more apparent to those skilled in the art in light of the following detailed description taken into consideration with the accompanied drawings wherein like reference numerals indicate like or corresponding parts throughout the several views and wherein.

DESCRIPTION OF THE PREFERRED EMBODIMENT

Figure 1:
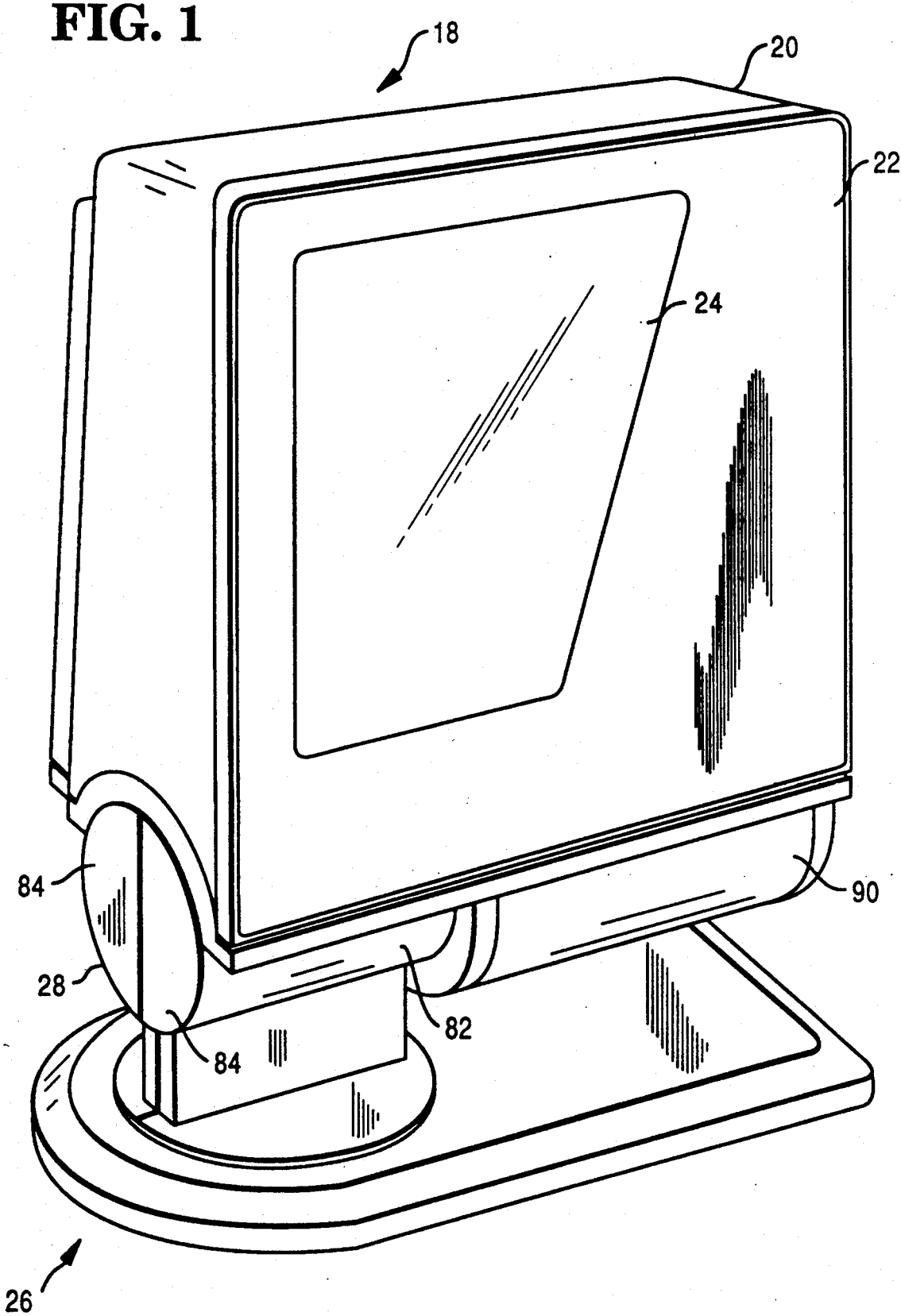
FIG. 1 is a perspective view of the optical scanner of the present invention.

Referring now to FIG. 1 there is shown a perspective view of the optical scanner of the present invention generally indicated by the numeral 18 which comprises a box-like housing structure 20 and which includes a front cover portion 22 having located therein a transparent substrate covered aperture 24. In the present embodiment, the cover portion 22 is constructed of red acrylic plastic with that portion not comprising the aperture 24 being covered by any type of opaque material. The housing structure 20 is rotatably mounted on a support member generally indicated by the numeral 26 which includes a circular socket portion 28 to which the housing structure 20 is rotatably secured for frictional movement about the socket portion in a manner to be described more fully hereinafter.

Figure 2:
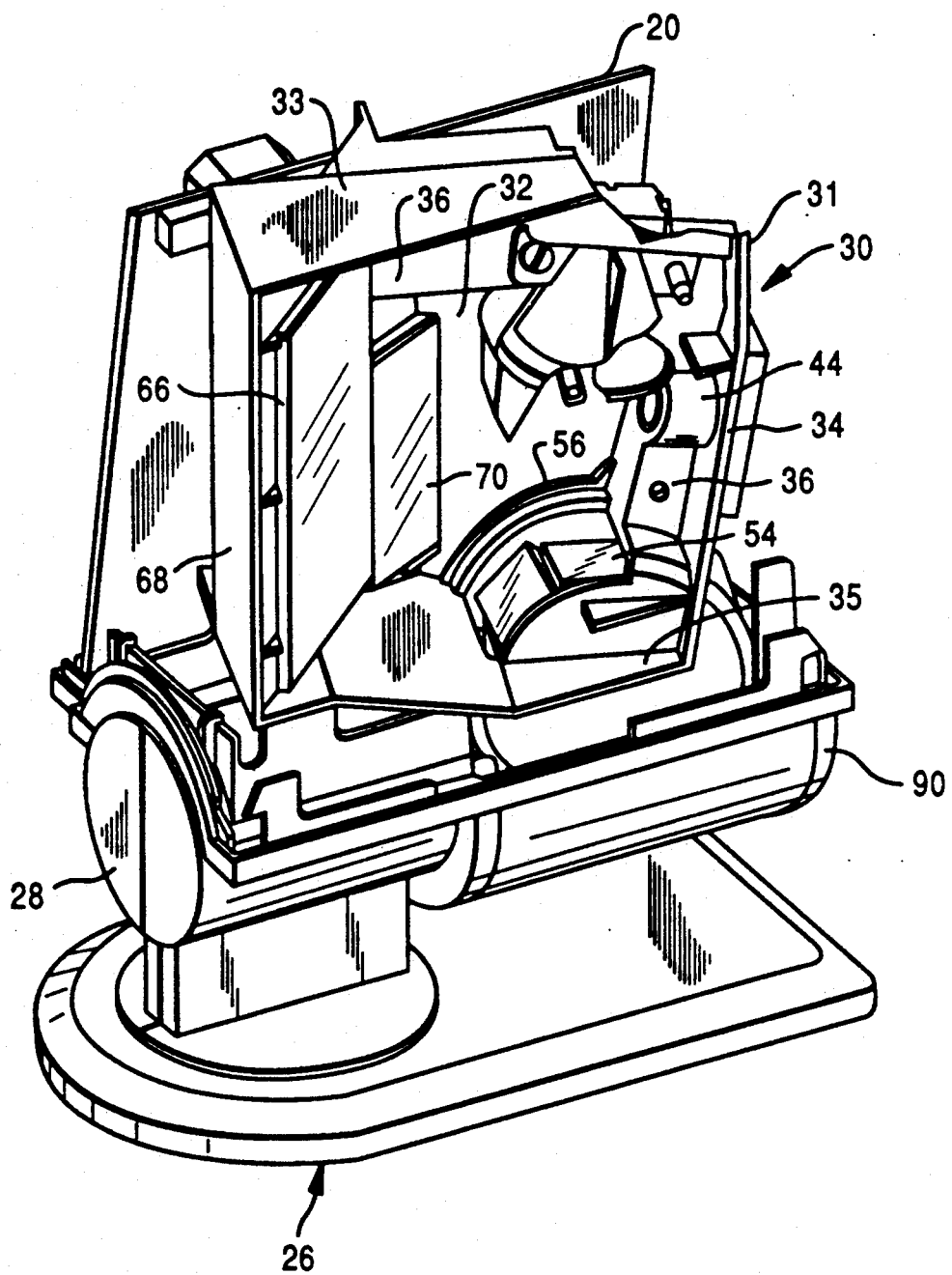
FIG. 2 is a perspective view similar to FIG. 1 with a portion of the outer housing cover removed showing details of the compact scanning apparatus of the present invention.

Referring now to FIG. 2 there is shown a perspective view of the scanning apparatus generally indicated by the numeral 30 with a portion of the housing structure 20 removed, within which is mounted an inner housing molded box-like structure generally indicated by the numeral 31. The front portion of such housing structure is open adjacent the aperture 24 (FIG. 1) of the housing structure 20. As best seen from FIGS. 2-6 inclusive, the inner housing box-like structure 31 which has a volume of seventy-five cubic inches includes a rear floor portion 32 (FIG. 4), a right side wall portion 34 (FIG. 2), a top wall portion 33 and a bottom wall portion 35.

Figure 3:
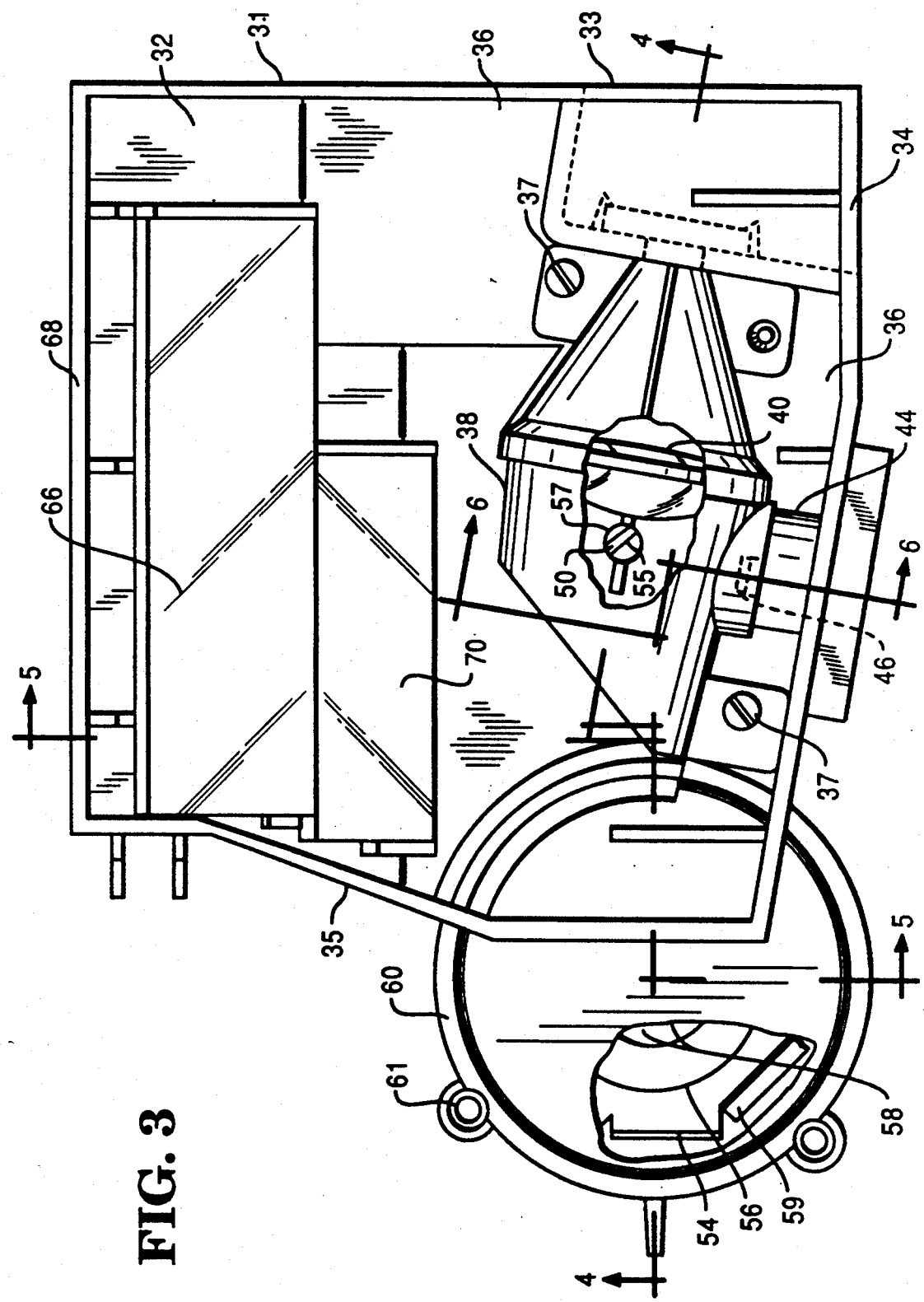
FIG. 3 is a side detailed view of the scanning apparatus of the present invention.

The rear floor portion 32 includes a molded L-shape ledge portion 36 (FIGS. 2-6 inclusive) which extends along the right side and the lower edge of the box-like structure 31 as viewed in FIGS. 2 and 3. Secured to the ledge portion 36 by means of screws 37 (FIG. 3) is a lens cover member 38 in which is mounted a collection lens member 40. The front portion 39 (FIG. 4) of the cover member 38 extends in a forward direction to restrict ambient light from outside the housing structure 20 from reaching a multifaceted spinner 56 (FIG. 2) which would interfere with the light reflected by the spinner. Mounted in the rear portion of the lens cover member adjacent the lowest surface of the ledge portion 36 is a photodiode 42 (FIG. 4) for generating electrical signals in response to receiving the reflected light beams from the scanned bar code label and which is collected by the collection lens member 40 and focused at a point at which the photodiode is located. As best seen in FIGS. 2, 3, and 7, forming a portion of the ledge portion 36 is a cylindrical portion 44 within which is mounted a visible laser diode 46 (FIG. 6) for projecting a laser light beam having a wave length of 670 nm along a light path 52 (FIG. 7) to a molded routing mirror 50 which deflects the laser light beam along the light path 52 for engagement with one of eight plano reflecting mirrors 54, 59 of the spinner 56. The routing mirror 50 is fabricated by injection molding with the reflecting surface comprising an evaporated aluminum coating which allows the mirror to have a very small diameter of 0.200 inches. This small diameter of the mirror 50 allows more of the reflected light to pass around it for collection by the collection lens 40. The routing mirror 50 is inserted into a slot 55 (FIGS. 3 and 4) located in a support member 57 which is molded as part of the housing structure 30. The housing structures 20, 31 and the mirror 50 are molded of a polycarbonate plastic material such a POLYCARBONATE /ABS BAYBLEND which is commercially available from the Mobay Corp. of Pittsburgh, Pa., 15205-9741.

Figure 4:
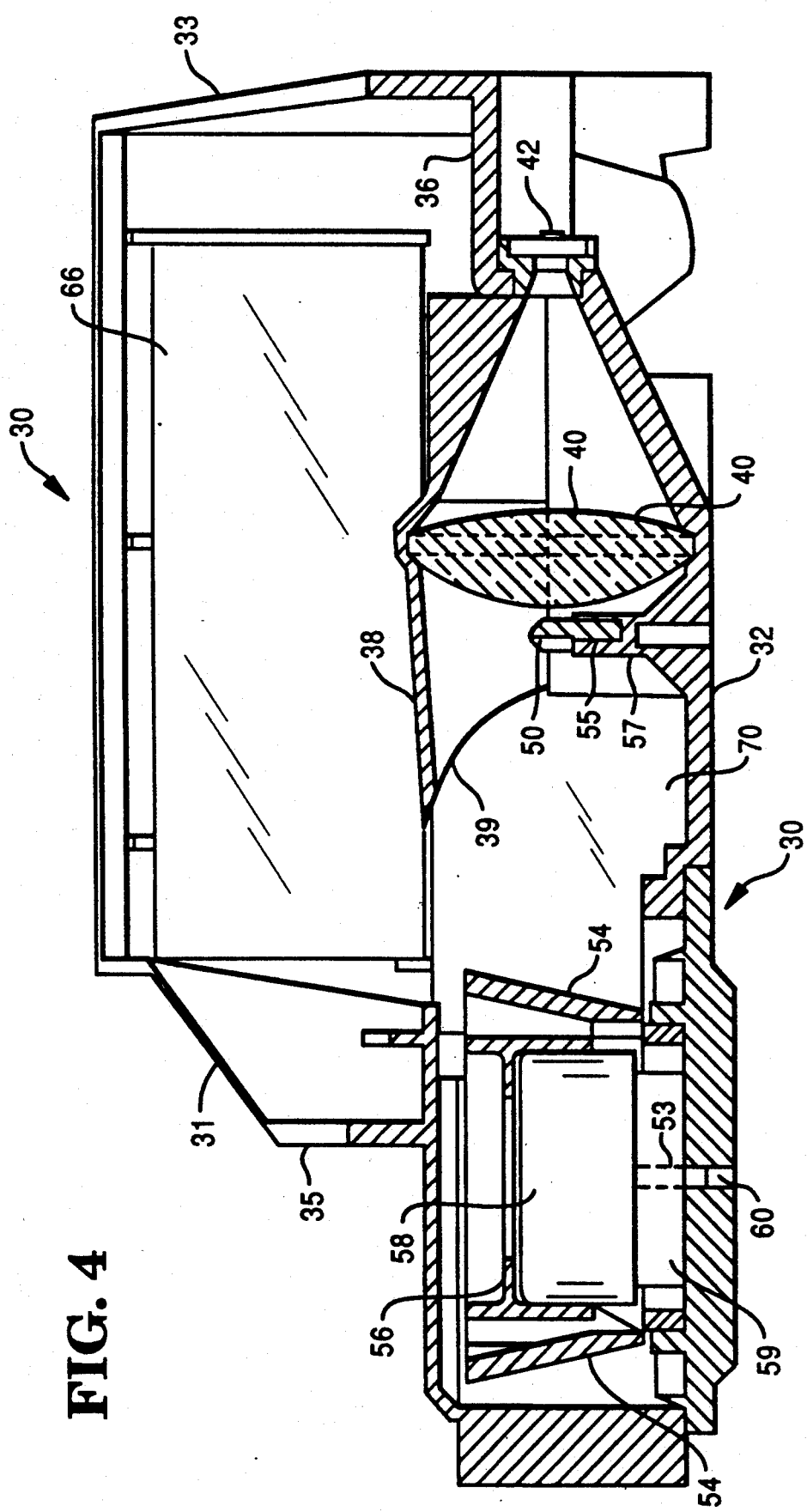
FIG. 4 is a sectional view taken on lines 4—4 of FIG. 3 showing the optical elements of the scanning apparatus.

As best seen in FIG. 4, the spinner 56 is rotatably mounted on a motor 58 which in turn is mounted on a cover member 60 secured to the rear edge portion 32 in any conventional manner such as screws 61 (FIG. 3). The reflecting mirrors or facets 54, 59 is set at various angles with respect to the axis of rotation of the spinner. For consecutive mirrors, the angle between the normal and the face of the mirrors and the spinner axis are 78.5, 81.5, 84.5, 87.5, 92.5, 95.5, 98.5 and 101.5 degrees with adjacent mirrors being orientated either in an upward direction (mirrors 59)(FIG. 5) or in a downward direction (mirrors 54)(FIG. 4) with oppositely mounted mirrors being mounted in the same direction (FIG. 4). The spinner is 0.900 inches high and each of the mirrors 54, 59 has a width of 0.650 inches. The mirrors are placed in a sequence that provides the spinner with a natural dynamic balance. The spinner axis of rotation is perpendicular to the path 52 (FIG. 7) of the incident laser light beam and is offset to such path by a distance of 0.612 inches or 10 degrees. Although the spinner could be fabricated from a hub and glass mirrors assembly, the preferred implementation is a fabricated part of acrylic material with injection molded optical surfaces having an evaporated aluminum coating. This reduces the cost of the spinner and since it isn't an assembly, the dynamic balance of the spinner is consistent enough to avoid the need for a balancing operation.

The motor 58 is a 5 volt brushless DC motor which rotates the spinner 56 at a speed of approximately 3200 rpm. The rotation of the spinner sequentially passes each of the eight reflecting mirrors or facets 54, 59 through the laser beam path 52. As a mirror passes through the beam, the beam/mirror incidence angle continuously changes resulting in a reflected beam which scans through space for each of the eight mirrors. The resulting pattern of light generally indicated by the numeral 62 (FIG. 9) can be thought of as a set of eight distinct scan surfaces 64, 65. The shape of each of the scan surfaces 64, 65 is closely conic. The set of eight mirrors can be divided into four pairs of scan surfaces, each pair being symmetrical about a plane through the center of the spinner. Four of the scan surfaces 59 which are orientated in an upward direction will reflect the laser light beam in a direction which strikes a large pattern mirror 66 located adjacent a side wall portion 68 (FIGS. 2-5 inclusive and 7) of the housing structure 31. The remaining four scan surfaces 54 which are orientated in a downward direction will reflect the laser light beam at a small pattern forming mirror 70 located adjacent the large pattern forming mirror 66. As best seen from FIG. 5, the large pattern mirror is orientated at an angle of 60 degrees to a plane passing through the light path 52 of the laser light beam deflected by the routing mirror 50 while the small pattern mirror 70 is orientated at an angle of 45 degrees. Both mirrors are mounted on the floor portion 32.

Figure 6:
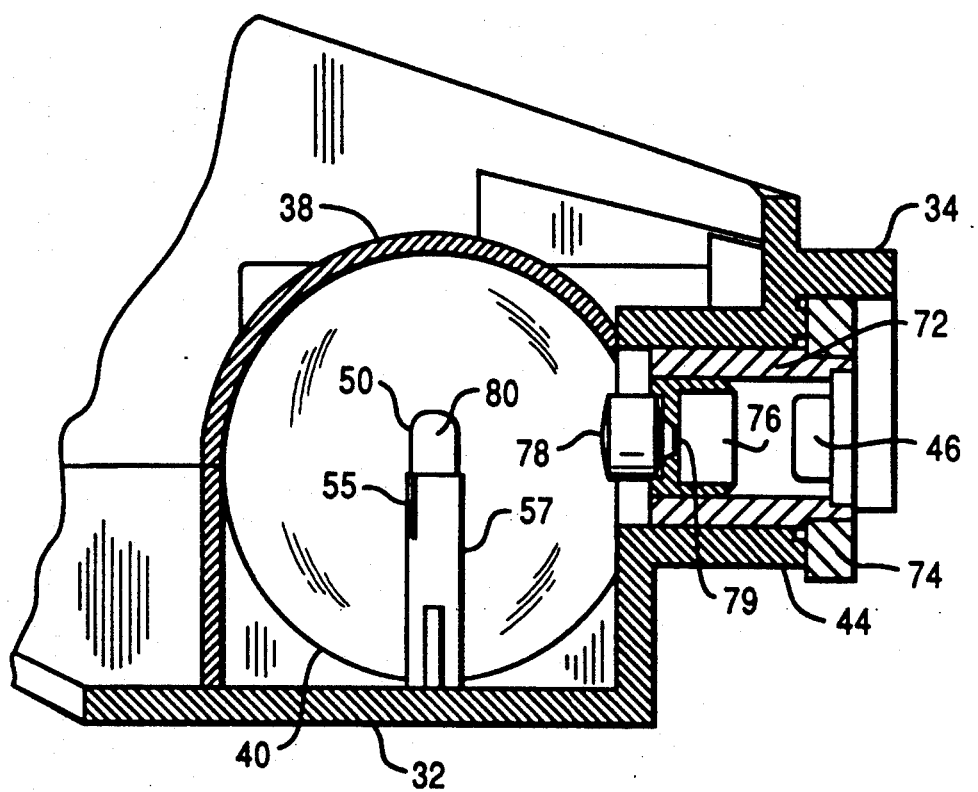
FIG. 6 is a sectional view taken on lines 6—6 of FIG. 3 showing details of the mounting of the laser diode and the focusing lens.
Figure 7:
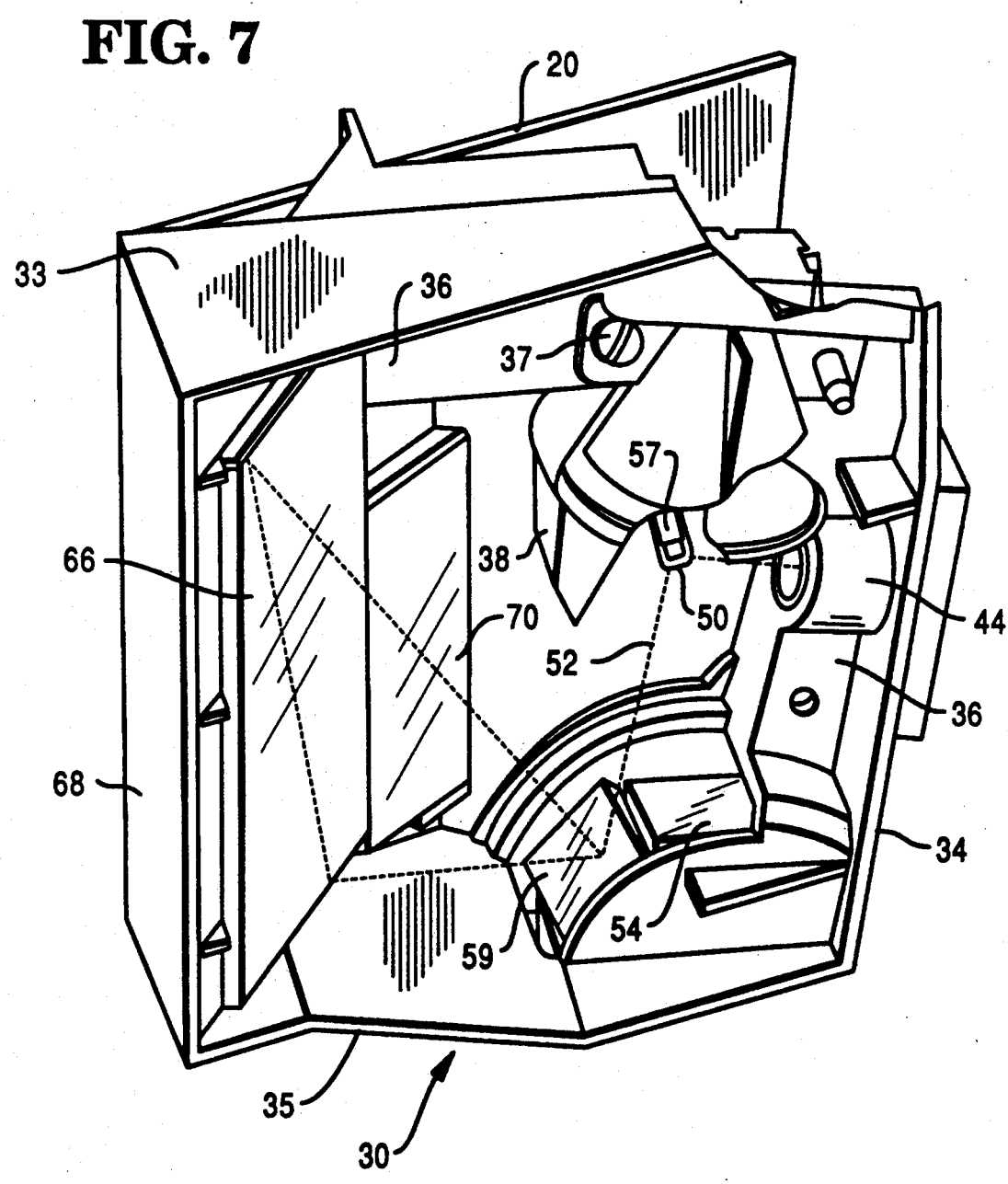
FIG. 7 is an enlarged right side perspective view of the scanning apparatus showing the light path of the scanning light beams as they are reflected from the spinner to the pattern forming mirrors.

Referring to FIG. 6, there is shown a sectional view of the cylindrical portion 44 (FIG. 3) of the housing structure 31 in which is mounted the laser diode 46. The laser diode 46 is shown mounted in one end of a heat sink member 72 comprising an aluminum cylinder mounted in a plate member 74. The heat sink member is slip fitted into the aperture 44 and held in place by two molded snap members (not shown). Press fitted into the front portion of the heat sink member 72 is a cylindrically shaped aluminum support member 76 for supporting a molded acrylic biconvex focusing lens 78 of 11 mm focal length. The support member 76 includes a 1.05 mm diameter aperture 79. By mounting the support member 76 in the heat sink 72, the distance between the diode 46 and the lens 78 can be easily changed, allowing the projection optics focus to be adjusted. The distance is selected to allow the laser beam to come to a focus in the scanning region adjacent the aperture 24 (FIG. 1) with a $1/e^2$ spot diameter of 180 microns. This method of focus adjustment has two major advantages over the standard practice of using a threaded adjustment. First, the relative location of the support member 76 and the lens 78 is more stable resulting in a stable collimating beam and an easier adjustment. Second, since no threads are required between the support member 76 and the heat sink 72, the overall cost of this construction is lower. The collimated beam emitted from the lens 78 strikes the plano reflecting surface 80 of the routing mirror 50 and is deflected 90 degrees towards the pattern forming mirrors 66 and 70.

Figure 8:
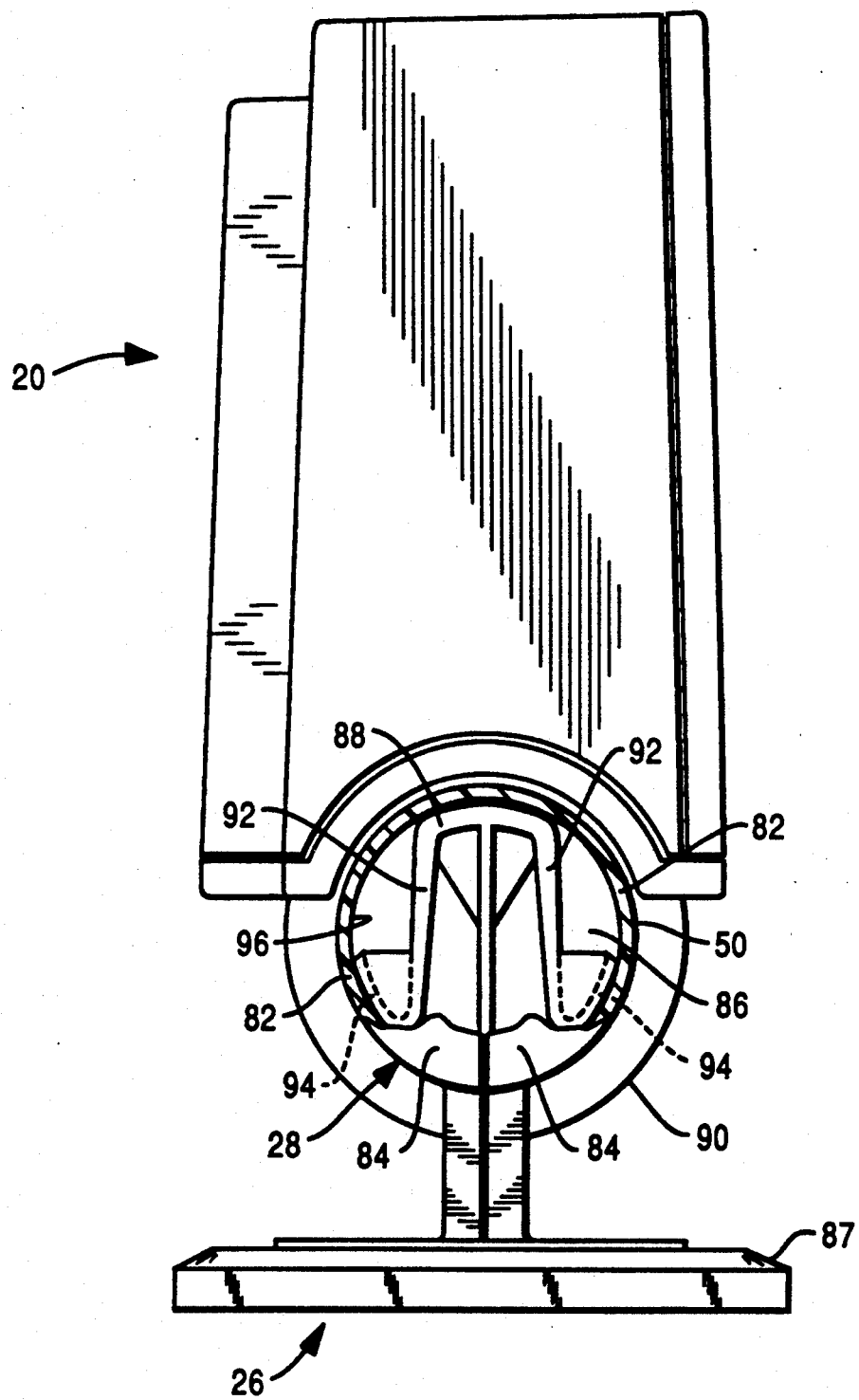
FIG. 8 is a side view of the scanning apparatus shown in FIG. 1 showing details of the pivot mechanism for rotating the housing structure between horizontal and vertical positions.
Figure 10A:
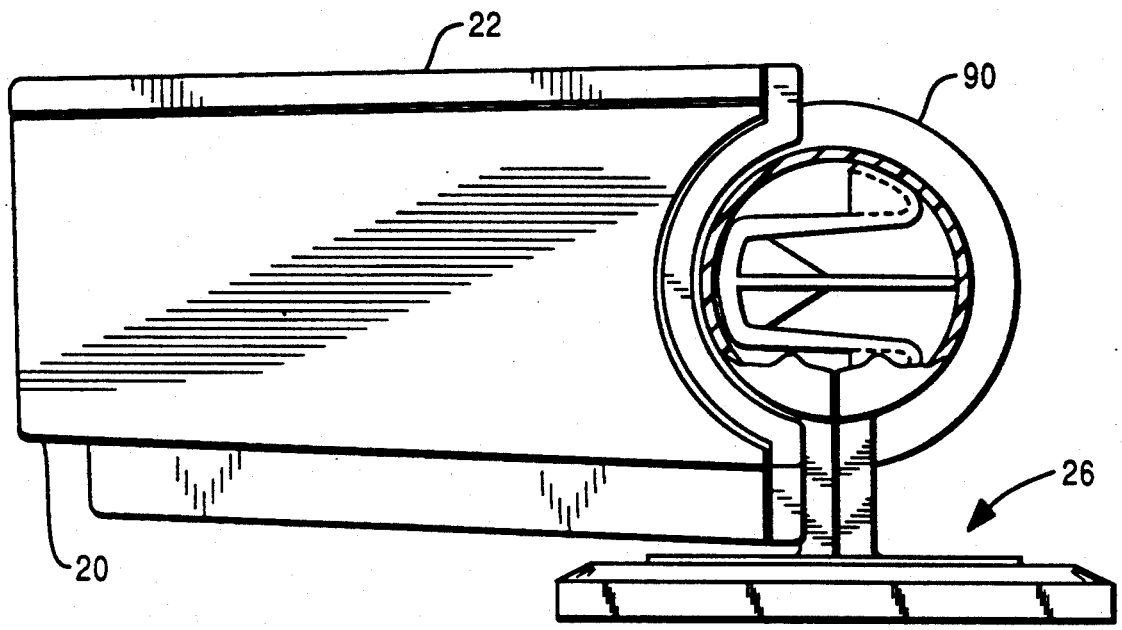
FIG. 10A is a side view of the optical scanner rotated into a horizontal position over which a bar code is moved during a scanning operation.
Figure 10B:
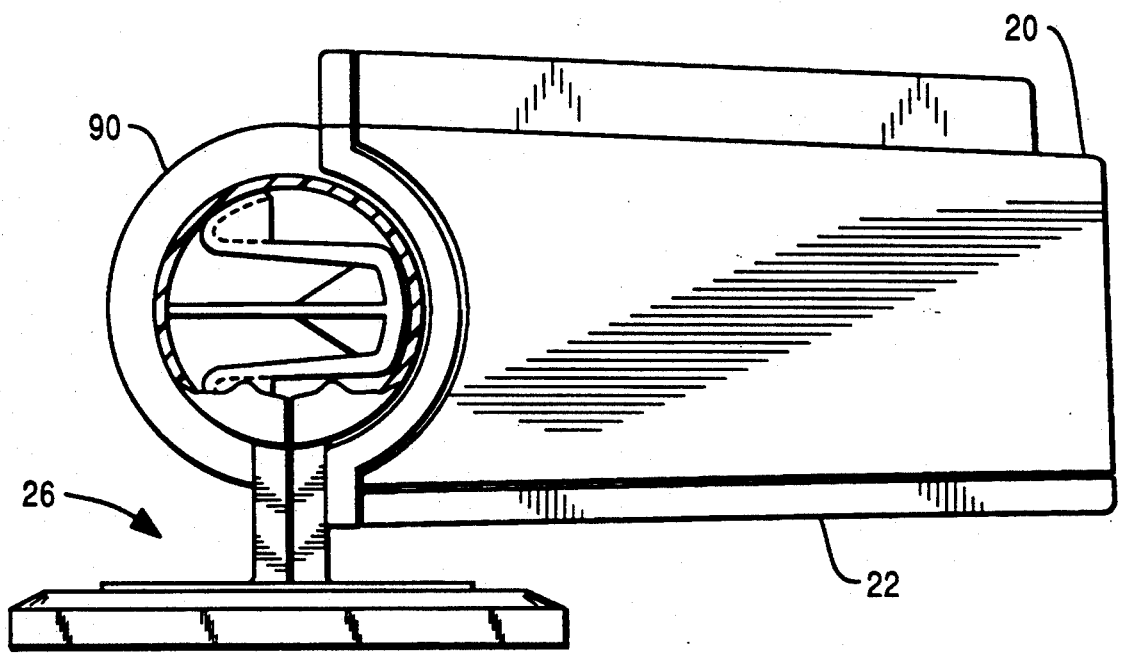
FIG. 10B is a side view of the optical scanner rotated into a horizontal position under which a bar code is moved during a scanning operation.

Referring to FIG. 8, there is shown a side view of the housing structure 20 (FIG. 1) with a portion of the sidewall portion of the socket portion 28 removed showing details of its construction allowing the housing structure 20 (FIG. 1) to be rotated about the socket portion 28. FIGS. 10A and 10B show the housing structure rotated in opposite horizontal positions allowing a scanning operation to occur either above or below the housing structure. The socket portion 28 is comprised of a pair of clam shells 82 having one end enclosed by a side wall portion 84 (FIG. 1) and which are joined together to form a hollow cylinder 86 when mounted to the base 87 of the support member 26. Inserted into the open end of the cylinder 86 is a compressible pivot member 88 secured to cylindrically shaped lower housing portion 90 (FIGS. 1 and 2) of the housing structure 20. The pivot member 88 includes a pair of depending arm members 92 each having flexible curved end portions 94 which, when inserted into the cylinder 86, will be compressed by the inner surface 96 of the cylinder, providing a frictional drag on the cylinder when the housing structure 20 is rotated enabling the structure to be located in any position (FIGS. 1, 10A and 10B). For a complete description of the socket member 28 and the pivot member 88, reference should be made to the previously cited U.S. Pat. No. 5,108,062.

Figure 5:
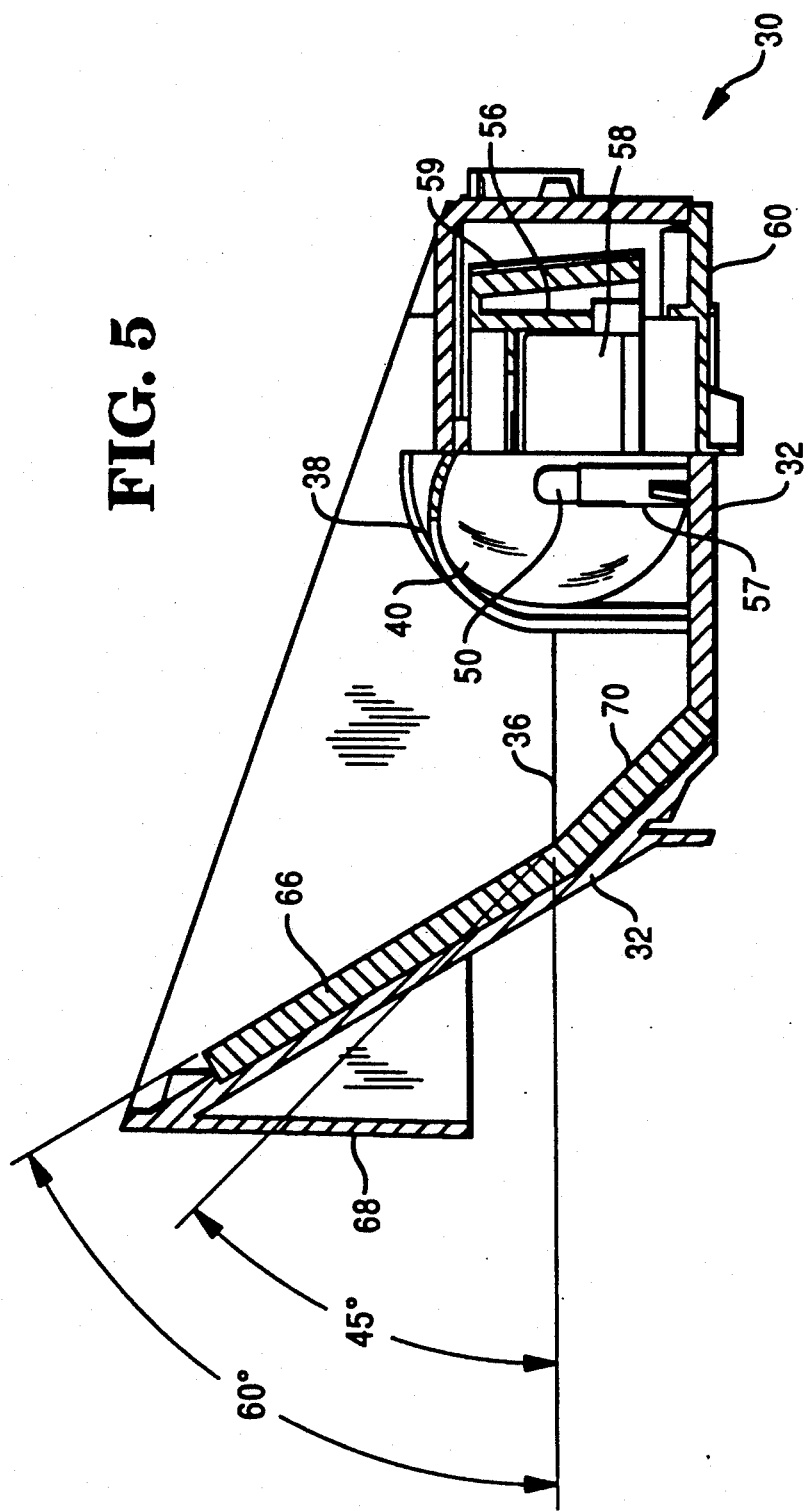
FIG. 5 is a sectional view taken on lines 5—5 of FIG. 3 showing the orientation of the pattern forming mirrors.
Figure 9:
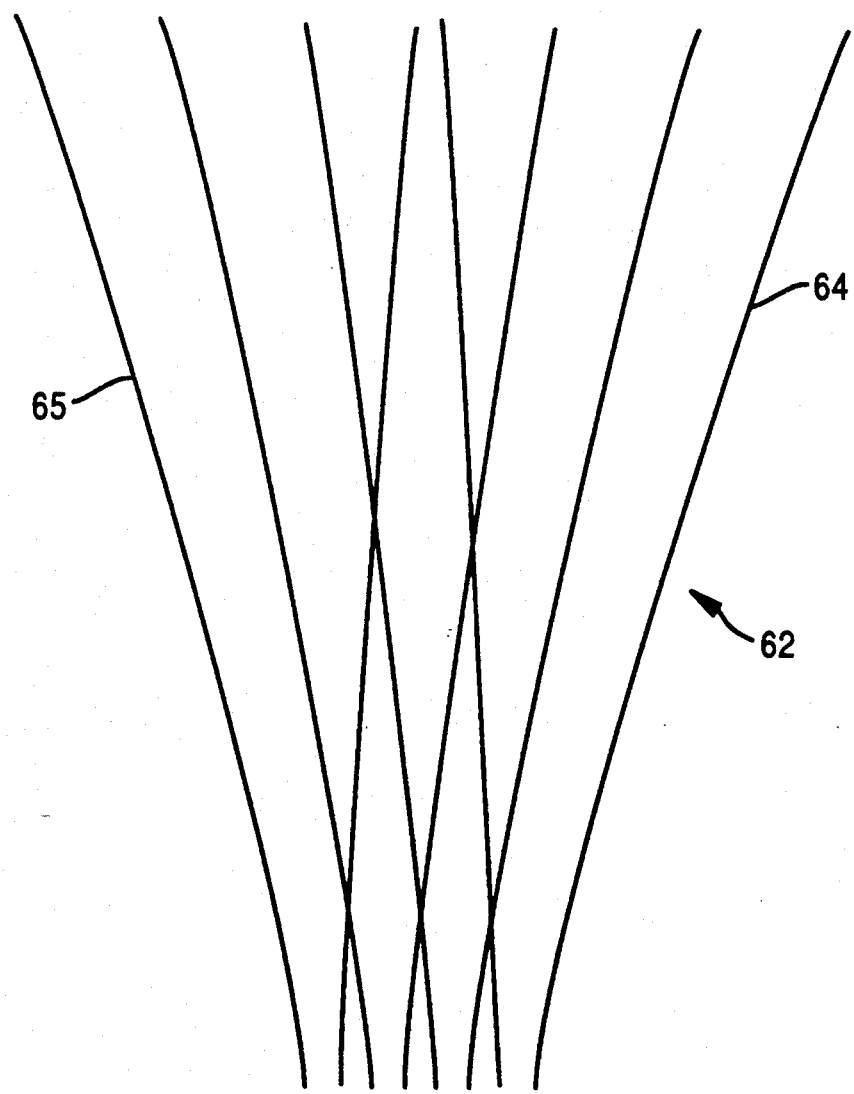
FIG. 9 is a plan view of the scan pattern generated by the pattern forming mirrors.

Referring now to FIG. 9, there is shown a plan view of the scan pattern 62 generated by the pattern forming mirrors 66, 70 (FIGS. 2-5 inclusive). This pattern consists of eight hyperbola shaped scan lines 64, 65 having a very low curvature. This is due, in part, to the small incidence angle between the projected laser beam and the offset angle of the mirrors 54, 59 of the spinner 56 together with the offset distance of the spinner with respect to the path 52 (FIG. 7) of the projected laser beam. This offset relationship between the spinner and the beam path results in the scan lines 64, 65 not being symmetrical thereby enhancing the low curvature of the lines. These scan lines also have an angular spacing of between three and five degrees allowing for the complete scanning of high aspect ratio truncated bar code labels during which scanning the bar code label may be rotated more than thirty degrees. The four scan lines 64 are generated by the mirrors 54 (FIG. 4) which are offset in a downward direction and which deflect the light beams at the pattern forming mirror 70 (FIG. 5). The scan lines 65 are generated by the mirrors 59 (FIGS. 5 and 7) which are offset in an upward direction and which deflect the light beams at the pattern forming mirror 66 (FIG. 7). The angle of the mirrors 66 and 70 to each other results in the pattern of four scan lines 64 crossing the pattern of four scan lines 65 at a very low angle enabling scan pattern 62 to be projected over a very narrow scanning area.

The laser beam outputted by the laser diode 46 (FIGS. 3 and 6) will be projected along the path 52 (FIG. 7) to be deflected off the routing mirror 50, one of the mirrors 54, 59 of the spinner 56 and the pattern forming mirrors 66, 70 to scan a bar code (not shown) positioned adjacent the aperture 24 (FIG. 1) in the form of the scan pattern 62 (FIG. 9). The scattered light reflected from the scanned bar code label will be reflected back by the mirrors 66, 70, 54 and 59 towards the lens 40 which collects and focuses the reflected light at the photodiode 42 (FIG. 4). The photodiode transforms the received light intensity into electrical signals in a manner that is well known in the art. The photodiode 42 is positioned at the image point for a source positioned at the far end of the scanning region so as to use the spherical aberration present in the lens 40 to balance out the amount of light collected from the near and far ends of the scanning region. With this arrangement, the use of an aspheric collection lens is avoided. Depending on the location and conditions of the checkout station, the housing structure 20 may be rotated to any position which enhances the scanning operation by the checkout operator.

Although the preferred embodiment of the present invention has been described herein, it is not intended that the invention be restricted thereto but that it be limited only by the true spirit and scope of the appended claims.

What is claimed is:

1. A compact optical scanning apparatus adapted for movement between a horizontal and a vertical position for reading bar code symbols on objects passing adjacent the scanning apparatus comprising:

a housing assembly including a surface having an aperture therein, a floor portion and oppositely located first and second wall portions located adjacent said aperture and a third wall portion extending between said first and second wall portions;

a support member having a socket portion rotatably supporting said housing assembly for movement between a horizontal and a vertical position;

a pivot member including a pair of flexible arm portions secured to said housing assembly and positioned within the socket portion for exerting a frictional force on the socket portion of the support member for holding the housing assembly in an adjusted position;

a source of a coherent light beam mounted in said third wall portion for projecting the light beam along the floor portion of said housing assembly;

first light deflecting means mounted on said floor portion for reflecting the projected light beam along a first light path;

a multifaceted mirror member having an axis of rotation and being mounted adjacent said floor portion and said second and third wall portions in said first light path for cyclically sweeping the light beam along a plurality of second light paths, said mirror member including a plurality of mirror facets in which a first mirror facet slopes downwardly in and towards the axis of rotation at a first predetermined angle from the axis and an adjacent second mirror facet slopes downwardly out and away from the axis of rotation at a second predetermined angle from the axis;

drive means mounted adjacent said floor member and rotatably supporting said multifaceted mirror member for rotating said multifaceted mirror member;

second light deflecting means mounted adjacent the floor member in a stationary position with respect to the multifaceted mirror member and in said second light paths for establishing a range of path lengths for said second light paths, which includes a minimum path length and a maximum path length, and for deflecting the light beams in said second light path along a plurality of third light paths through said aperture in the form of a scanning pattern for scanning a bar code label positioned adjacent the aperture;

a lens member positioned adjacent said first light deflecting means and said first wall portion for collecting the light beams reflected from the scanned bar code label and directing the collected light beams along a fourth light path; and detecting means mounted in said first wall portion and in said fourth light path for generating electrical signals in response to receiving the collected light beams form said lens member.

2. The scanning apparatus of claim 1 which further includes a cover member mounted between said first and third wall portions over said lens member and adjacent said multifaceted mirror member for restricting ambient light from reaching said multifaceted mirror member.

3. The scanning apparatus of claim 1 in which the difference between the first and second predetermined angles is approximately three degrees.

4. The scanning apparatus of claim 1 which further includes a focusing member mounted for movement in said third wall member adjacent said source of coherent light beam for adjusting the focal point of the light beam.

5. The scanning apparatus of claim 1 in which said housing assembly includes an inner housing member which occupies approximately seventy-five cubic inches.

6. The scanning apparatus of claim 1 in which said second light deflecting means comprises a pair of pattern forming mirror members mounted on and at an angle to said floor portion and in said second light paths for deflecting the light beams along said third paths to form a scan pattern comprising a plurality of slightly curved scan lines.

7. A compact optical scanning apparatus adapted for movement between a horizontal and a vertical position for reading bar code symbols on objects passing adjacent the scanning apparatus comprising:

a first housing member including a surface having an aperture therein;

a horizontal support member having a socket portion rotatably supporting said first housing member for movement between a horizontal and a vertical position about said support member;

a pivot member including a pair of flexible arm portions positioned within the socket portion for exerting a frictional force on the socket portion for holding the housing member in an adjusted position;

a second housing member mounted within said first housing member including a floor portion, oppositely located first and second wall portions located adjacent said aperture and a third wall portion extending between said first and second wall portions;

a source of a coherent light beam mounted in said third wall portion for projecting light beam along the floor portion of said second housing member;

a first mirror member mounted on said floor portion for deflecting the projected light beam along a first light path;

a multifaceted mirror member having an axis of rotation and being mounted adjacent said floor portion and said second and third wall portions in said first light path for cyclically sweeping the light beam along a plurality of second light paths, said mirror member including a first mirror facet sloping downwardly in and towards the axis of rotation at a first predetermined angle from the axis and an adjacent second mirror facet sloping downwardly out and away from the axis of rotation at a second predetermined angle from the axis with every other mirror facet on said mirror member being oriented in the same direction;

drive means mounted adjacent said floor member and rotatably supporting said multifaceted mirror member for rotating said multifaceted mirror member;

a plurality of second mirror members mounted on the floor member in a stationary position with respect to the multifaceted mirror member and in said second light paths for establishing a range of path lengths for said second light path, which includes a minimum path length and maximum path length, and for deflecting the light beams in said second light paths along a plurality of third light paths through the aperture in the form of a scanning pattern for scanning a bar code label positioned adjacent the aperture;

a lens member positioned adjacent said first light deflecting means and said first wall portion for collecting the light beams reflected from the scanned bar code label and directing the collected light beams along a fourth light path; and detecting means mounted in said first wall portion and in said fourth light path for generating electrical signals in response to receiving the collected light beams from said lens member.

8. The scanning apparatus of claim 7 which further includes a cover member mounted between said first and third wall portions over said lens member and adjacent said multifaceted mirror member for restricting ambient light from reaching said multifaceted mirror member.

9. The scanning apparatus of claim 7 which further includes a support member mounted on said floor portion and includes a slotted portion within which said first mirror member is mounted.

10. The scanning apparatus of claim 7 in which the difference between the first and second predetermined angles is approximately three degrees.

11. The scanning apparatus of claim 7 which further includes a focusing member mounted for movement in said third wall member adjacent said source of coherent light beam for adjusting the focal point of the light beam.

12. The scanning apparatus of claim 11 in which the third wall member includes an aperture extending therethrough, said source of scanning light beams being mounted at one end of the aperture and said focusing member being mounted at the opposite end of the aperture.

13. The scanning aperture of claim 12 which further includes a support member for supporting said focusing member, said support member being slidably mounted in said opposite end of the aperture enabling the focusing member to be moved within the aperture to vary the focal point of the light beams.

14. The scanning apparatus of claim 7 in which said second housing member occupies approximately seventy-five cubic inches.

15. The scanning apparatus of claim 7 in which said second light deflecting means comprises a pair of pattern forming mirror members mounted on and at an angle to said floor portion and in said second light paths for deflecting the light beams along said light paths forming a scan pattern comprising a plurality of curved scan lines.

* * * * *